US011143445B2

(12) United States Patent
Pearl et al.

(10) Patent No.: US 11,143,445 B2
(45) Date of Patent: Oct. 12, 2021

(54) REFRIGERATION HOSE WITH MULTIPLE ACCESS POINTS AND METHOD OF EVACUATING AN AIR CONDITIONING OR REFRIGERATION UNIT USING THE SAME

(71) Applicant: Uniweld Products, Inc., Fort Lauderdale, FL (US)

(72) Inventors: Douglas B. Pearl, Hollywood, FL (US); David Foster, Plantation, FL (US)

(73) Assignee: Uniweld Products, Inc., Fort Lauderdale, FL (US)

( * ) Notice: Subject to any disclaimer, the term of this patent is extended or adjusted under 35 U.S.C. 154(b) by 623 days.

(21) Appl. No.: 14/675,835

(22) Filed: Apr. 1, 2015

(65) Prior Publication Data
US 2016/0290694 A1    Oct. 6, 2016

(51) Int. Cl.
*F25B 45/00* (2006.01)
*F16L 55/07* (2006.01)
*B60H 1/00* (2006.01)

(52) U.S. Cl.
CPC ......... *F25B 45/00* (2013.01); *B60H 1/00585* (2013.01); *F16L 55/07* (2013.01); *F25B 2345/001* (2013.01)

(58) Field of Classification Search
CPC ............... F25B 45/00; F25B 2345/006; F25B 2345/003; F16L 55/07
See application file for complete search history.

(56) References Cited

U.S. PATENT DOCUMENTS

| 4,338,793 | A | * | 7/1982 | O'Hern, Jr. | F25B 45/00 137/231 |
| 5,333,467 | A | | 8/1994 | Pearl et al. | |
| 5,377,493 | A | * | 1/1995 | Friedland | F25B 45/00 62/149 |
| 5,540,254 | A | * | 7/1996 | McGowan | F17C 13/04 137/315.01 |
| 6,155,066 | A | * | 12/2000 | Chandler | B05B 11/0005 62/192 |
| 7,127,902 | B1 | * | 10/2006 | Levy | B60H 1/00585 62/77 |
| 8,875,524 | B1 | | 11/2014 | Parnell | |

(Continued)

OTHER PUBLICATIONS

Gupton, HVAC Controls: Operation and Maintenance, 2002, Prentice Hall, 3rd Edition, pp. 250-251 (Year: 2002).*

(Continued)

*Primary Examiner* — David J Teitelbaum
(74) *Attorney, Agent, or Firm* — Nields, Lemack & Frame, LLC

(57) ABSTRACT

A hose having an upstream end and a downstream end, each of the upstream and downstream ends including a connecting member to connect the hose arrangement to, for example, the high side or the low side of an air conditioning or refrigeration unit, or to a manifold. An intermediate access fitting is provided along the length of the hose, such as a T-shaped fitting, and provides a port to enable the hose arrangement to be connected to a device conveniently and without the necessity of adapters. Also disclosed is a method of evacuating or dehydrating an air conditioning or refrigeration system using the hose.

4 Claims, 3 Drawing Sheets

(56) References Cited

U.S. PATENT DOCUMENTS

2002/0152759 A1* 10/2002 Brass ................ B60H 1/00585
 62/124
2004/0078974 A1   4/2004 St. James et al.
2009/0113901 A1*  5/2009 Carrubba ........... B60H 1/00585
 62/77
2014/0265317 A1   9/2014 Pearl, II et al.

OTHER PUBLICATIONS

European communication dated Aug. 29, 2016 in corresponding European patent application No. 16162787.2.
European communication dated Nov. 30, 2016 in corresponding European patent application No. 16162787.2.
European communication dated Mar. 26, 2021 in corresponding European patent application No. 16162787.2.
European communication dated Apr. 17, 2020 in corresponding European patent application No. 16162787.2.

* cited by examiner

REFRIGERATION HOSE WITH MULTIPLE ACCESS POINTS AND METHOD OF EVACUATING AN AIR CONDITIONING OR REFRIGERATION UNIT USING THE SAME

BACKGROUND

Mechanical air conditioning and refrigeration is accomplished by continuously circulating, evaporating, and condensing a fixed supply of refrigerant in a closed system. Charging or recharging an air conditioning or refrigeration system with refrigerant is done through the low side suction intake fitting with the use of manifold gauges and service hoses. Low-pressure vapor refrigerant is compressed and discharged from a compressor as a high temperature, high-pressure, "superheated" vapor or liquid. The high-pressure refrigerant flows to a condenser, where it is changed to a low temperature, high-pressure liquid. It then flows through a filter dryer to a thermal expansion valve or TXV. The TXV meters the correct amount of liquid refrigerant into an evaporator. As the TXV meters the refrigerant, the high-pressure liquid changes to a low pressure, low temperature, saturated liquid/vapor. This saturated liquid/vapor enters the evaporator and is changed to a low pressure, dry vapor. The low pressure, dry vapor is then returned to the compressor. The cycle then repeats.

The manifold commonly has three refrigeration lines or hoses connected thereto. One line is connected through the manifold to a low pressure gauge and is used in servicing the low pressure side (suction side) of a refrigeration/air conditioning system. A second line is connected through the manifold to a high pressure gauge and is used in servicing the high pressure side (discharge side) of a refrigeration/air conditioning system. A third line is connected to a port which commonly connects the ports in the manifold leading to the high and low pressure lines. The third line is used for connection to a refrigerant source or some other pressurized source, or a vacuum source.

Flow control is performed by means of high pressure and low pressure valves at the manifold. Whenever any of the aforementioned three lines are connected to a refrigeration or air conditioning system, the lines can be bled to purge the air from the lines so as to avoid contamination of the refrigeration system with air (and moisture in that air).

The presence of moisture in an air conditioning or refrigeration system can result in freeze-ups and corrosion, as even trace amounts of water (e.g., water vapor) can react with the refrigerant and form acids that can damage the system. A vacuum pump or the like can be connected to the system to pull a vacuum in an effort to eliminate moisture (and air) from the system. Preferably an accurate gauge (e.g., a micron gauge) is used to monitor the extent of the vacuum created, as the compound gauges of the manifold assembly are not accurate enough to effectively measure vacuum.

However, setting up a vacuum pump and connecting it to the system can be time consuming and difficult, particularly in a confined space. The service ports of many air conditioning and refrigeration systems are located in a tight space where there is inadequate room to connect a gauge. In addition, even where there is adequate room, other hoses need to be disconnected.

It therefore would be desirable to facilitate the connection of a vacuum pump or other equipment to an air conditioning or refrigeration unit.

Other objects a advantages of the present invention and advantageous features thereof will become apparent as the description proceeds herein.

SUMMARY

Problems of the prior art have been addressed by the embodiments disclosed herein, which relate a hose arrangement or assembly having an upstream end and downstream end. Each of the upstream and downstream ends may include a connecting member to connect the hose arrangement to, for example, the high side or the low side of an air conditioning or refrigeration unit, or to a manifold. In certain embodiments, the hose arrangement includes an intermediate access fitting, such as a T-shaped fitting, located along the length of the hose at a position anywhere between the upstream and downstream ends. In certain embodiments, the intermediate access fitting provides a port to enable the hose arrangement to be connected to a device (e.g., be in fluid communication with a device such as a measuring device) conveniently and without the necessity of adapters, and without having to disconnect other hoses.

Also disclosed is a method of evacuating or dehydrating an air conditioning or refrigeration system. In certain embodiments, a method comprises connecting a first end of a first hose to the low side of an air conditioning or refrigeration system and the second end of the first hose to a manifold; connecting a first end of a second hose to the high side of an air conditioning or refrigeration system and the second end of the second hose to the manifold; and connecting the first end of a third hose to a vacuum pump and the second end of the third hose to the manifold. A suitable gauge, such as a micron gauge (an electronic vacuum gauge), may be attached to the intermediate access port of the first hose. The vacuum pump is activated, the manifold valves are opened, and vacuum is pulled on the air conditioning or refrigeration unit and measured through the intermediate access port by the pressure gauge. No adapters or the like are necessary to attach the pressure gauge as was previously required.

DETAILED DESCRIPTION

Figure 1:
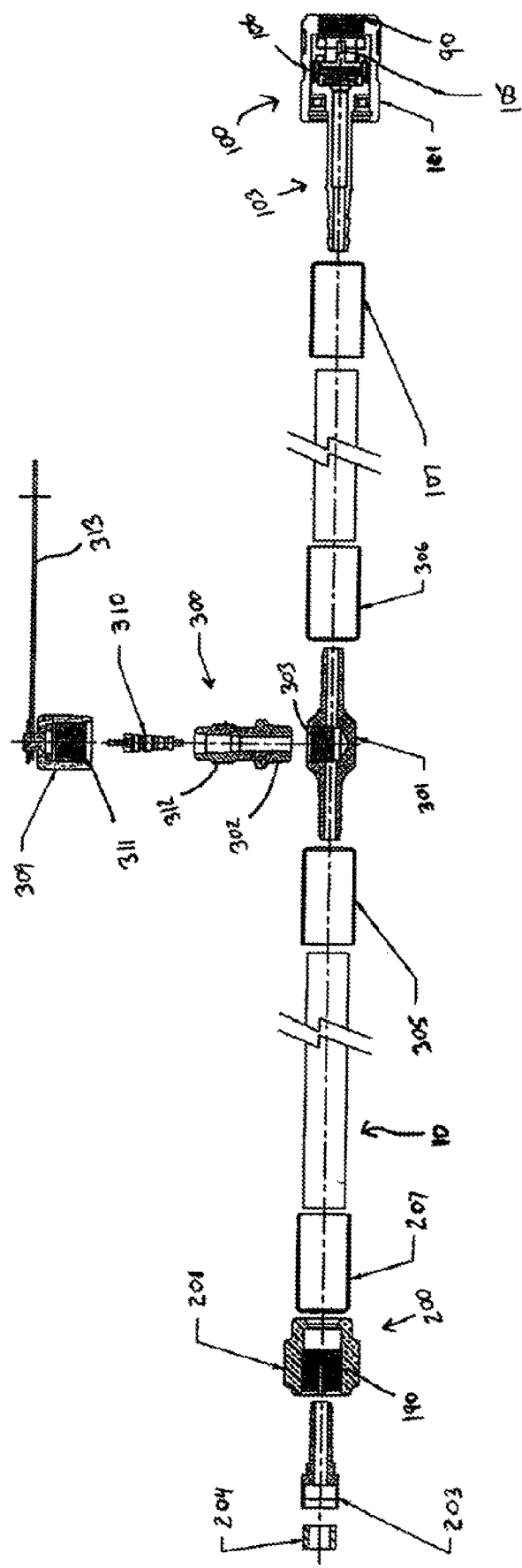
FIG. 1 is a cross-sectional view of a hose arrangement in accordance with certain embodiments.
Figure 2:
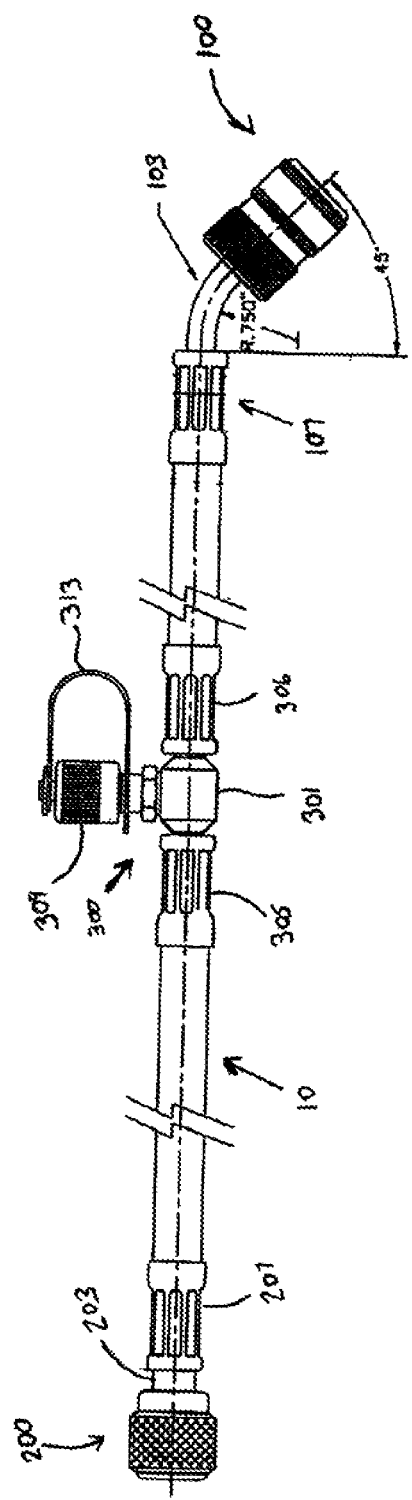
FIG. 2 is a side view of a hose arrangement in accordance with certain embodiments.

Turning now to FIGS. 1 and 2, there is shown in cross-section a refrigeration service hose 10 in accordance with certain embodiments. One or more of such service hoses 10 may be used in servicing refrigeration and air conditioning systems to check the charge pressure of the refrigerant, in the system, to add refrigerant to the system, to check the performance of the compressor (particularly the compressor valves), to test the expansion valve, and for various other service procedures. Typically hose 10 provides a sealed connection between a manifold gauge set and an HVAC or refrigeration system, such as connecting a service valve (e.g., the low side or high side of the system to be serviced), with a pressure gauge, refrigerant source, pressurized gas source or vacuum source.

Hose 10 is a flexible elongated member having an internal bore permitting fluid communication between opposite free ends of the hose. In certain embodiments, it is typically composed of a seamless nylon inner tube that provides a barrier layer, surrounded by synthetic braided reinforcement layer (e.g., rubber) which is further surrounded by a thermoplastic cover, which results in relatively dense, gas-proof and liquid-proof conduit. Such hoses are typically from three to six feet in length, although any length hose could be used without departing from the scope of the embodiments disclosed herein. They are rated for high pressure use, e.g., 800 psi working pressures.

Hose 10 may include at one free end thereof a connector 100 that includes hose nut 101 having internal threads 90 and is adapted to form a liquid-tight and gas-tight connection with the threaded exterior of a one-way refrigeration service valve (not shown), for example, such as a Schraeder valve. In certain embodiments, within hose nut 101 there is a valve depressor 205 that is biased by biasing member 106 towards the free end of the hose nut 101. In certain embodiments, the valve depressor 105 Is positioned to depress the core of a Schraeder service valve upon connection of nut 101 to the valve, thereby opening the valve. In the embodiment shown, the connector 100 is a low loss anti-blowback fitting, such as that disclosed in U.S. Publ. No 2014/0265317, the disclosure of which is hereby incorporated by reference. Such a fitting traps refrigerant in the hose 10 and helps reduce environmental contamination. Those skilled in the art will appreciate that other connectors can be used and are within the spirit, and scope of the embodiments disclosed herein.

In certain embodiments, nipple 103 may be integrally attached to hose 10 at eight-sided crimped ferrule 107, which renders the connection gas-tight and liquid-tight. In certain embodiments, nipple 103 may include a bend, such as 45°, for ease in installation in tight or hard to reach areas.

Another connector shown generally at 200 is similarly attached at the opposite free end of hose 10, as shown. Thus, hose nut 201 having internal threads 190 is adapted to form a liquid-tight and gas-tight connection with the threaded exterior of a manifold port (FIG. 3), for example. In certain embodiments, the connector 200 includes a straight hose nipple 203 and a neoprene sleeve 204 to facilitate the liquid and gas-tight connection. The nipple 203 may be attached to hose 10 with eight-sided crimp ferrule 207.

Hose 10 includes intermediate access fitting 300. In certain embodiments, the intermediate access fitting 300 is in fluid communication with the interior of the hose via hose splice member 301. The intermediate access fitting 300 may include external threads 302 for coupling to internal threads 303 of the hose splice member 301. Splice member 301 may be attached to the hose 10 with crimped hose ferrules 305, 306. Other ways of providing an intermediate access fitting 300 in a hose 10 are within the scope of the embodiments disclosed herein.

In certain embodiments, the access fitting 300 receives a one-way valve 310, such as a Schraeder valve. Actuation of the valve by a device (not shown) such as a measuring device (e.g., a micron gauge) results in fluid communication between the hose 10 and the device. The valve normally closed, so that the hose 10 can be used in conventional applications with no leakage through the intermediate access fitting. A cap 309 may be coupled to the access fitting 300 such as with internal threads 311 that mate with external threads 312 on the access fitting 300. The cap may be tethered to the access fitting 300 with strap 313.

The access fitting 100 may be used for purposes other than connection to a measuring device. For example, it can be used to charge or remove refrigerant from a system, inject die into a system, purge nitrogen into a system, etc.

Although the particular location of the intermediate access fitting 300 along the length of the hose is not particularly limited, in certain embodiments the access fitting 300 is positioned closer to connector 100 (e.g., the connector that attaches to the access port of a refrigeration or air conditioning unit) than connector 200 (e.g., the connector that attaches to a manifold). So positioning the intermediate access fitting 300 allows connection of an external device such as a measuring device (e.g., a micron gauge) at a location closer to the access port of the air conditioning or refrigeration unit, which can be more convenient for the technician. In certain embodiments, the intermediate access fitting 300 is positioned about 12 inches from connector 100.

Figure 3:
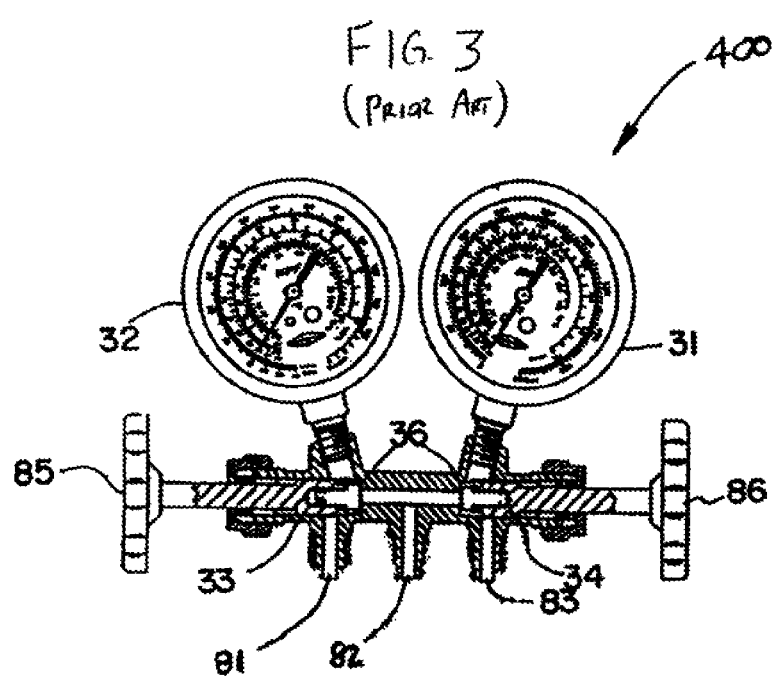
FIG. 3 is a view, in partial cross-section, of a conventional, refrigeration service apparatus including three-port manifold with pressure gauges.

FIG. 3 illustrate a conventional manifold 400 that includes low pressure port 81, high pressure port 83, and common port 82 which is capable of communicating with the other two ports 81 and 83 when valves 33 and 34 are in the open positions. Low pressure or compound gauge 32 is threaded to manifold 30 and communicates with port 81 when handle 85 is actuated to open low pressure valve 33, thereby unseating seal 36. The low pressure side is used to measure the refrigerant pressure on the low pressure side of refrigeration or air conditioning system. Connector 100 leading from hose 10 on the low pressure side is threaded to the low pressure service valve of the air conditioning or refrigeration unit.

A second hose can be connected to common port 82, and leads to a refrigerant source or vacuum source to which it is connected for charging or evacuating a system.

High pressure port 83 communicates with high pressure valve 34, when high pressure valve 34 is opened by turning handle 86. Similarly to the low pressure hose 10, a high pressure hose can be connected to a high pressure service valve and is used, for example, to measure the pressure output of the compressor to determine the adequacy of the compressor's valves.

In certain embodiments, hose 10 can be used to carry out a method of evacuating or dehydrating an air conditioning or refrigeration system. For example, a first end of a first hose 10 may be connected to the low side of an air conditioning or refrigeration system (not shown) and the second end of the first hose to the low pressure port 81 of manifold 400. Similarly, a first end of a second hose may be connected to the high side of an air conditioning or refrigeration, system and the second end of the second hose to the high pressure port 83 of manifold 400. The first end of a third hose may be connected to an external device such as a vacuum pump (not shown) and the second end of the third hose to the common port 82 of manifold 400. A suitable pressure gauge, such as a micron gauge, can be attached to the intermediate access port of the first hose. The vacuum pump is activated, the manifold valves are opened, and vacuum is pulled on the air conditioning or refrigeration unit and measured through the intermediate access port by the pressure gauge. When the vacuum pressure gauge reaches a predetermined level for a predetermined amount of time, indicating a suitable vacuum has been achieved, the vacuum pump can be turned off. No separate adapters or the like are necessary to attach the pressure gauge as was previously required.

Although the manifold depicted in FIG. 3 is a so-called "three port" manifold, those skilled in the art will appreciate that other manifolds, such as a "four port" manifold, can be used. In a four port manifold, two intermediate hoses are employed instead of one.

What is claimed is:

1. A flexible hose configured to connect to an external device, said flexible hose comprising an elongated member with an internal bore, said hose having first and second free ends, a first connector at said first free end configured to form a liquid-tight and gas-tight connection with a first one-way valve, a second connector at said second free end configured to form a liquid-tight and gas-tight seal connection with a manifold, and an intermediate access port positioned between said first and second free ends, said intermediate access port having an access fitting in fluid communication with said internal bore and receiving a second one-way valve, such that when said flexible hose is connected to said external device and said second one-way valve is actuated by said external device to an open position, fluid communication between said internal bore and said external device is established.

2. The hose of claim 1, wherein said first connector is an anti-blowback fitting.

3. The hose of claim 1, wherein said intermediate access port is located closer to said first free end than said second free end.

4. The hose of claim 1, further comprising an electronic vacuum gauge in fluid communication with said intermediate access port.

* * * * *